US010256038B2

(12) United States Patent
Ogawa et al.

(10) Patent No.: US 10,256,038 B2
(45) Date of Patent: Apr. 9, 2019

(54) COIL, POWER RECEIVING APPARATUS, AND POWER TRANSMITTING APPARATUS

(71) Applicant: KABUSHIKI KAISHA TOSHIBA, Tokyo (JP)

(72) Inventors: Kenichirou Ogawa, Kawasaki (JP); Tetsu Shijo, Tokyo (JP); Akiko Yamada, Yokohama (JP); Shuichi Obayashi, Yokohama (JP); Hiroki Shoki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 705 days.

(21) Appl. No.: 14/174,188

(22) Filed: Feb. 6, 2014

(65) Prior Publication Data

US 2014/0252867 A1   Sep. 11, 2014

(30) Foreign Application Priority Data

Mar. 6, 2013   (JP) ................. 2013-044226

(51) Int. Cl.
*H01F 38/14* (2006.01)
*H01F 27/28* (2006.01)
*H01F 3/14* (2006.01)
*B60L 11/18* (2006.01)
*H02J 7/02* (2016.01)
(Continued)

(52) U.S. Cl.
CPC ............ *H01F 38/14* (2013.01); *B60L 11/182* (2013.01); *B60L 11/1824* (2013.01); *H01F 3/14* (2013.01); *H01F 27/28* (2013.01); *H02J 7/025* (2013.01); *H02J 50/10* (2016.02); *H04B 5/0037* (2013.01); *B60L 2230/10* (2013.01); *B60L 2270/147* (2013.01); *Y02T 10/7005* (2013.01); *Y02T 10/7088* (2013.01); *Y02T 90/12* (2013.01); *Y02T 90/121* (2013.01); *Y02T 90/122* (2013.01); *Y02T 90/14* (2013.01)

(58) Field of Classification Search
CPC ............ H01F 27/28; H01F 3/14; H01F 38/14
USPC ......................................... 336/200; 29/602.1
See application file for complete search history.

(56) References Cited

U.S. PATENT DOCUMENTS 5,539,296 A * 7/1996 Ito .................... B60L 11/182
                                                    320/108
8,193,767 B2   6/2012 Inoue et al.
(Continued)

FOREIGN PATENT DOCUMENTS

CN   101425743 A   5/2009
CN   201893215 U   7/2011
(Continued)

OTHER PUBLICATIONS

Obayashi et al., U.S. Appl. No. 14/198,667, filed Mar. 6, 2014.
(Continued)

*Primary Examiner* — Rexford Barnie
*Assistant Examiner* — Elim Ortiz
(74) *Attorney, Agent, or Firm* — Finnegan, Henderson, Farabow, Garett & Dunner, L.L.P.

(57) ABSTRACT

In one embodiment, a coil includes a magnetic core and a winding. The magnetic core includes at least one block provided with a groove or an opening. Each block is arranged so as to make the groove or the opening extend along a direction of magnetic flux. The coil is used as a power transmitting coil or a power receiving coil.

21 Claims, 17 Drawing Sheets

(51) Int. Cl.
*H04B 5/00* (2006.01)
*H02J 50/10* (2016.01)

(56) References Cited

U.S. PATENT DOCUMENTS

| | | | |
|---|---|---|---|
| 9,251,950 B2 | 2/2016 | Hatanaka et al. | |
| 2005/0288742 A1* | 12/2005 | Giordano | A61N 1/3787 607/61 |
| 2009/0015210 A1* | 1/2009 | Kojima | B60L 3/04 320/163 |
| 2009/0058358 A1* | 3/2009 | Inoue | H01F 10/131 320/107 |
| 2010/0007215 A1 | 1/2010 | Sakuma | |
| 2010/0059258 A1 | 3/2010 | Yang et al. | |
| 2012/0161696 A1* | 6/2012 | Cook | B60L 11/182 320/108 |
| 2012/0256494 A1* | 10/2012 | Kesler | H03H 7/40 307/104 |
| 2013/0082537 A1* | 4/2013 | Kim | H01F 38/14 307/104 |
| 2013/0135077 A1 | 5/2013 | Shijo et al. | |
| 2014/0002228 A1* | 1/2014 | Hatanaka | H01F 38/14 336/200 |
| 2014/0049212 A1 | 2/2014 | Sawa et al. | |
| 2014/0125143 A1 | 5/2014 | Yamada et al. | |
| 2014/0139036 A1 | 5/2014 | Shijo et al. | |
| 2014/0252868 A1 | 9/2014 | Yamada et al. | |
| 2014/0253275 A1 | 9/2014 | Shijo et al. | |
| 2014/0265616 A1 | 9/2014 | Obayashi et al. | |

FOREIGN PATENT DOCUMENTS

| | | |
|---|---|---|
| DE | 10 2007 023 343 A1 | 12/2007 |
| EP | 2 246 864 A1 | 11/2010 |
| JP | S57-10211 A | 1/1982 |
| JP | H6-77055 A | 3/1994 |
| JP | 2010-41906 A | 2/2010 |
| JP | 2010-172084 A | 8/2010 |
| JP | 2011-116246 | 6/2011 |
| JP | 2012-228122 A | 11/2012 |
| TW | 200818220 | 4/2008 |
| WO | WO 2010/090538 A1 | 8/2010 |
| WO | WO 2012/128027 A1 | 9/2012 |
| WO | WO 2012/147341 A1 | 11/2012 |
| WO | WO 2013/003788 A1 | 1/2013 |

OTHER PUBLICATIONS

Shijo et al., U.S. Appl. No. 14/196,786, filed Mar. 4, 2014.
Yamada et al., U.S. Appl. No. 14/185,035, filed Feb. 20, 2014.
Budhia et al; "Design and Optimization of Circular Magnetic Structures for Lumped Inductive Power Transfer Systems", IEEE Transactions on Power Electronics, vol. 26, No. 11, pp. 3096-3108, (2011).
Akiko Yamada; U.S. Appl. No. 14/069,986, filed Nov. 1, 2013.
Tetsu Shijo; U.S. Appl. No. 14/081,591, filed Nov. 15, 2013.
Notification of the First Office Action issued by the State Intellectual Property Office of the People's Republic of China dated Sep. 21, 2015, for Chinese Patent Application No. 201410061225.8, and English-language translation thereof.
Notification of Reasons for Refusal dated May 17, 2018 in corresponding Japanese patent application No. 2013-044226 (4 pages), with Machine Translation (3 pages).
Partial European Search Report issued by the European Patent Office dated Jul. 20, 2017, for European Patent Application No. 14156333.8.

* cited by examiner

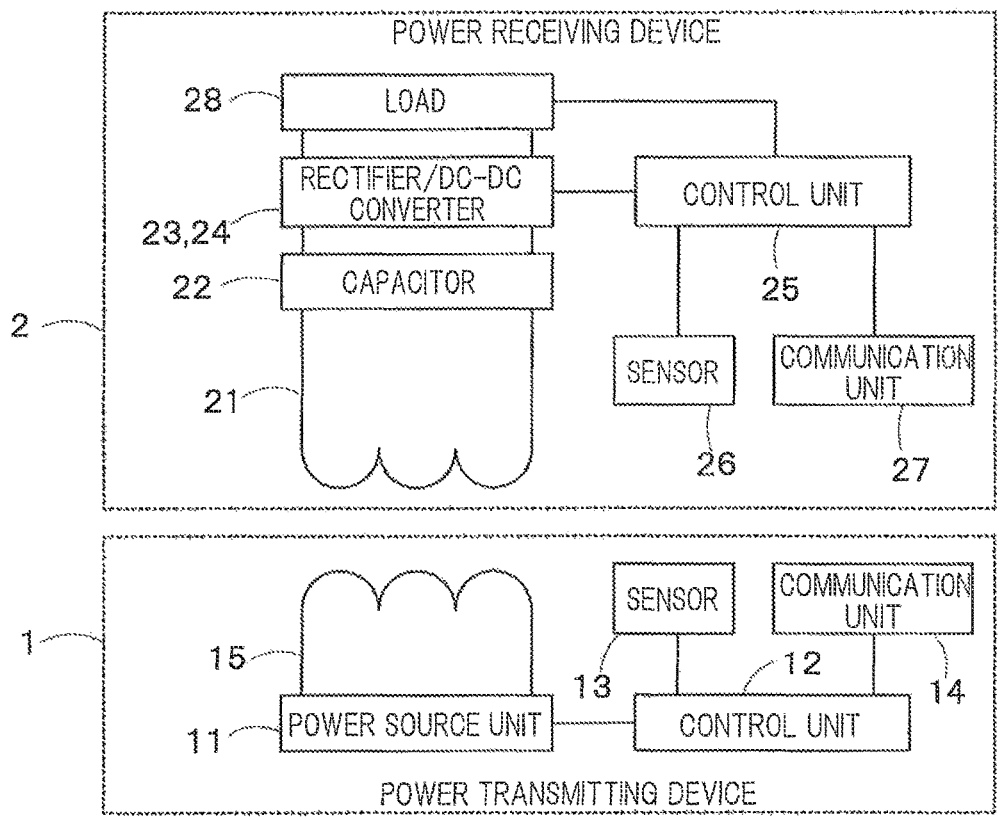
F I G. 1
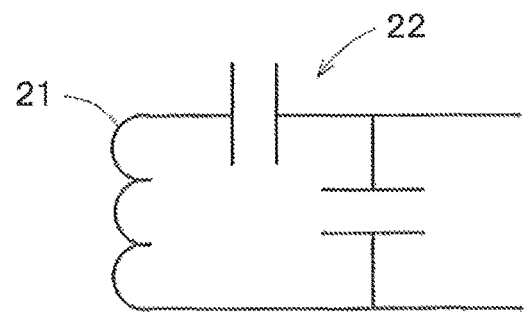
F I G. 2

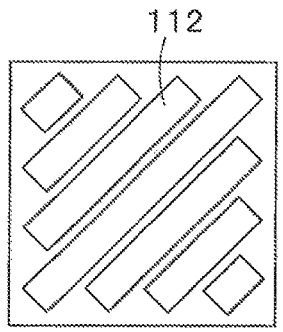 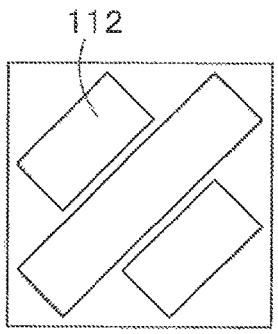 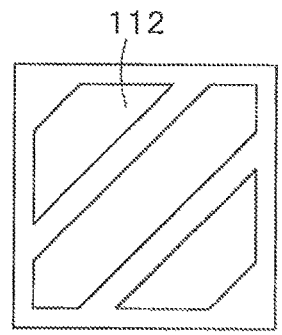
F I G. 14A      F I G. 14B      F I G. 14C
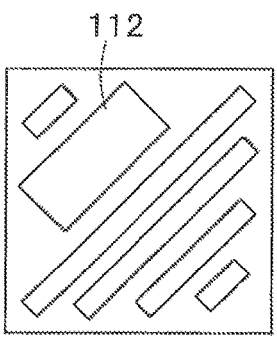 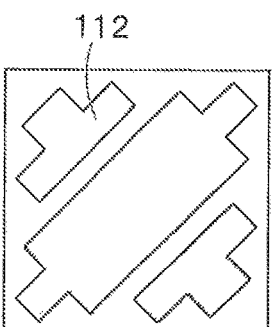
F I G. 14D     F I G. 14E
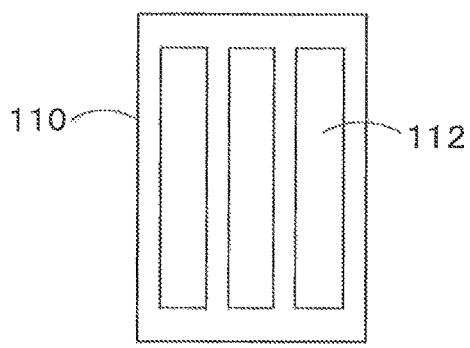
F I G. 15

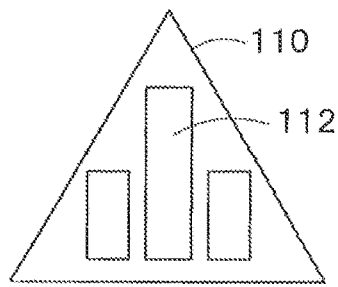 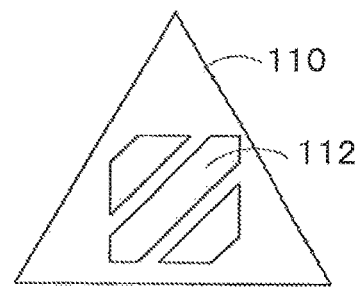
F I G. 16A    F I G. 16B
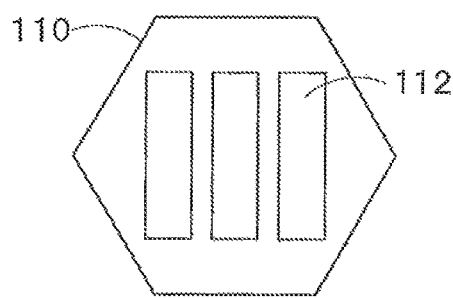 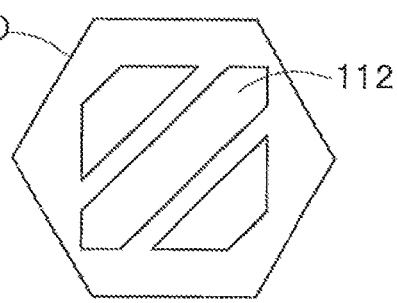
F I G. 17A    F I G. 17B
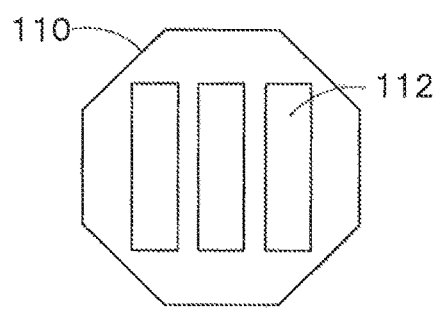 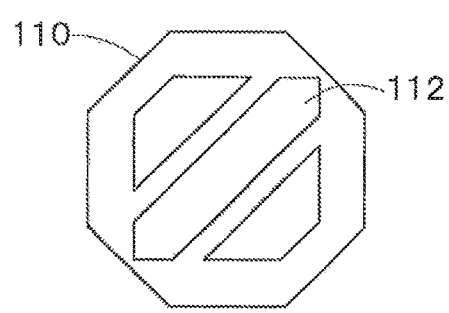
F I G. 18A    F I G. 18B

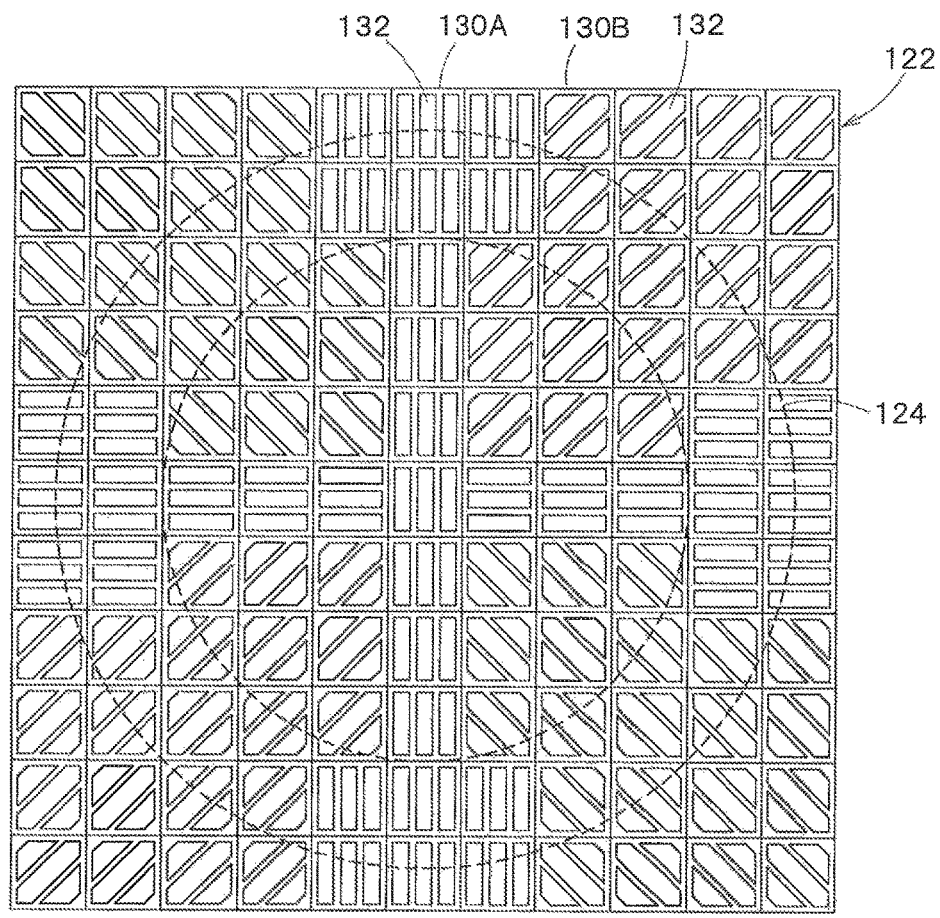
F I G. 19

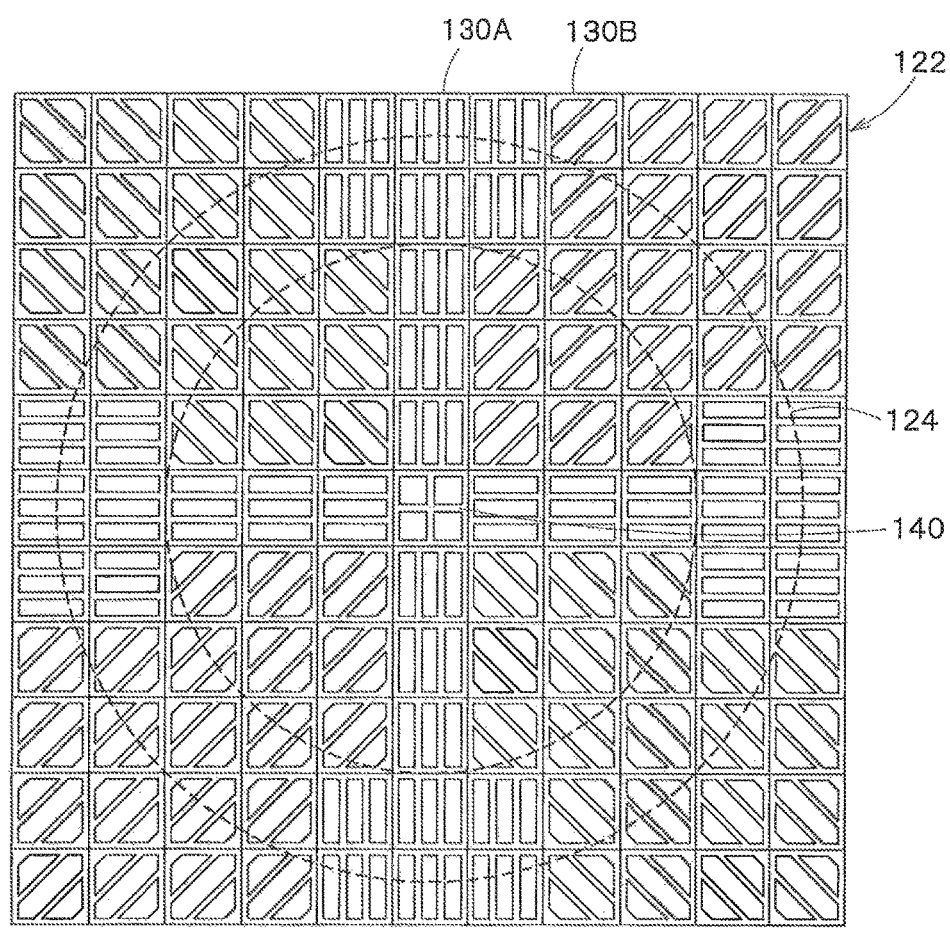
F I G. 21

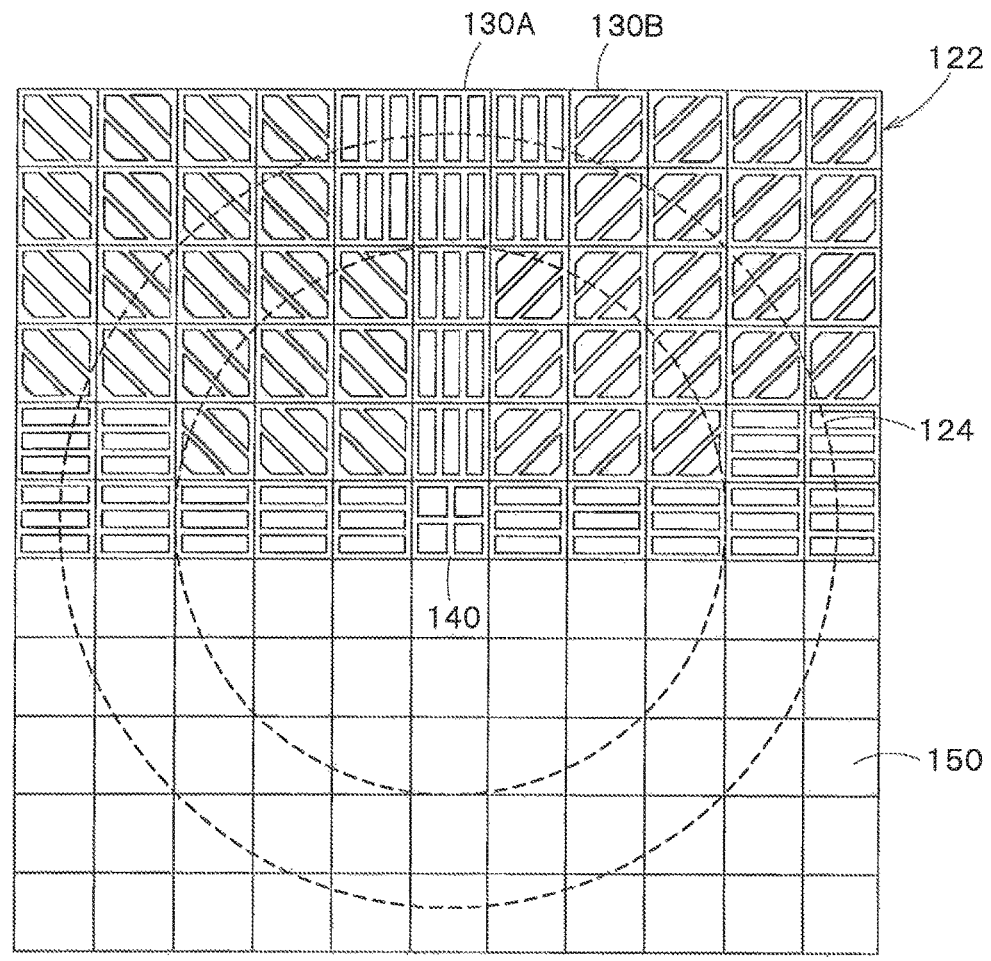
F I G. 22

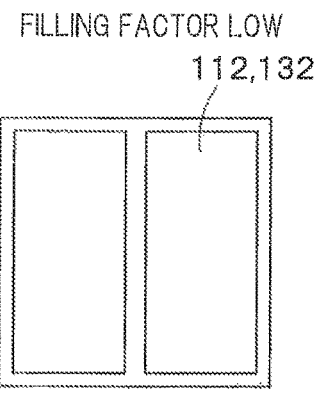
F I G. 23A
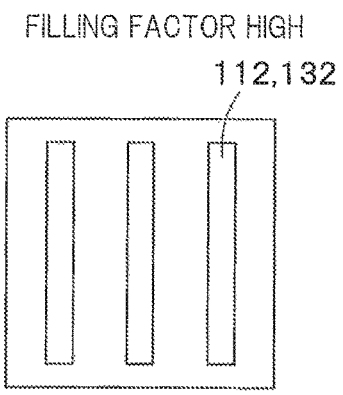
F I G. 23B
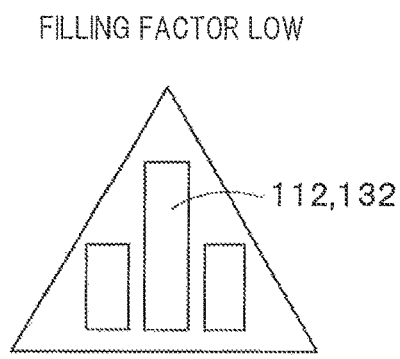
F I G. 24A
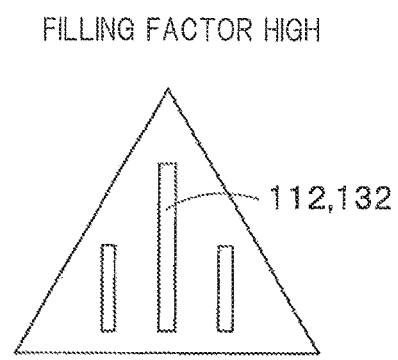
F I G. 24B
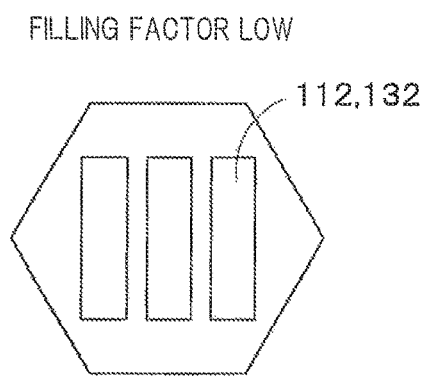
F I G. 25A
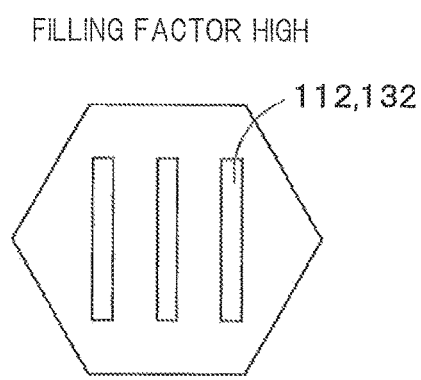
F I G. 25B

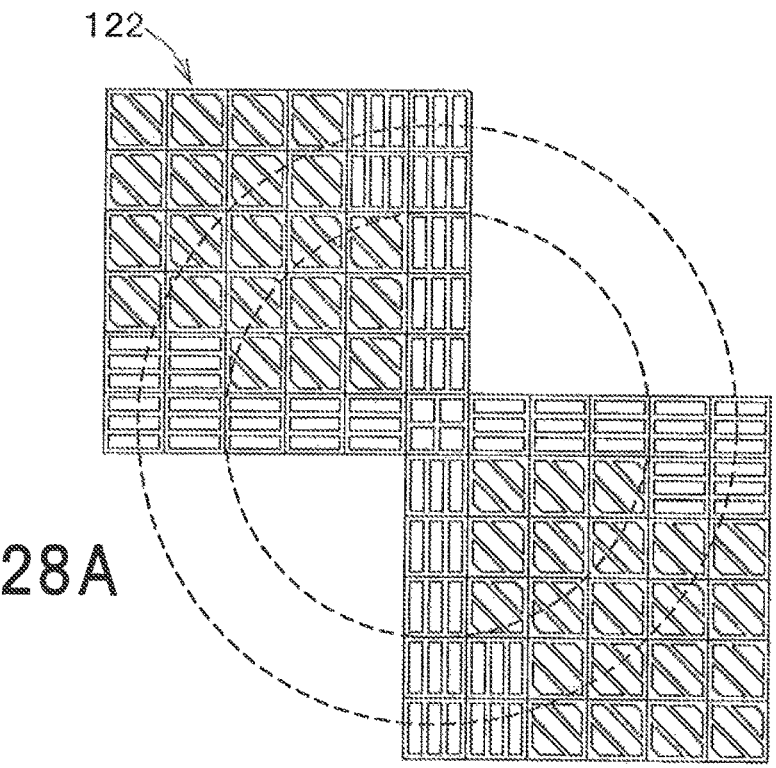
F I G. 28A
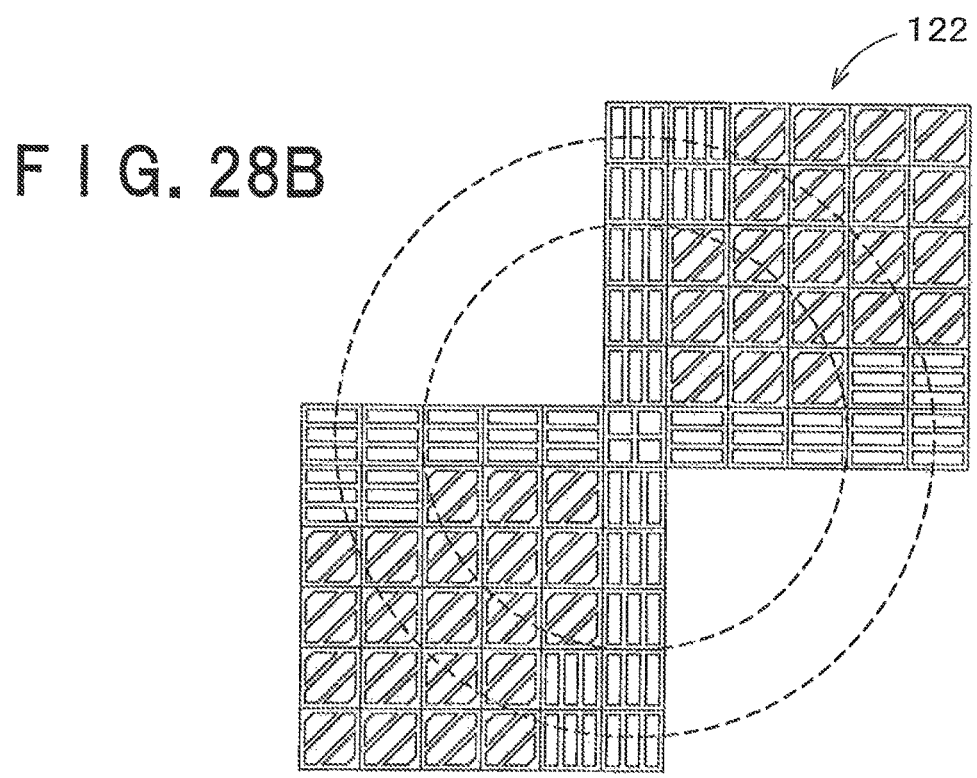
F I G. 28B

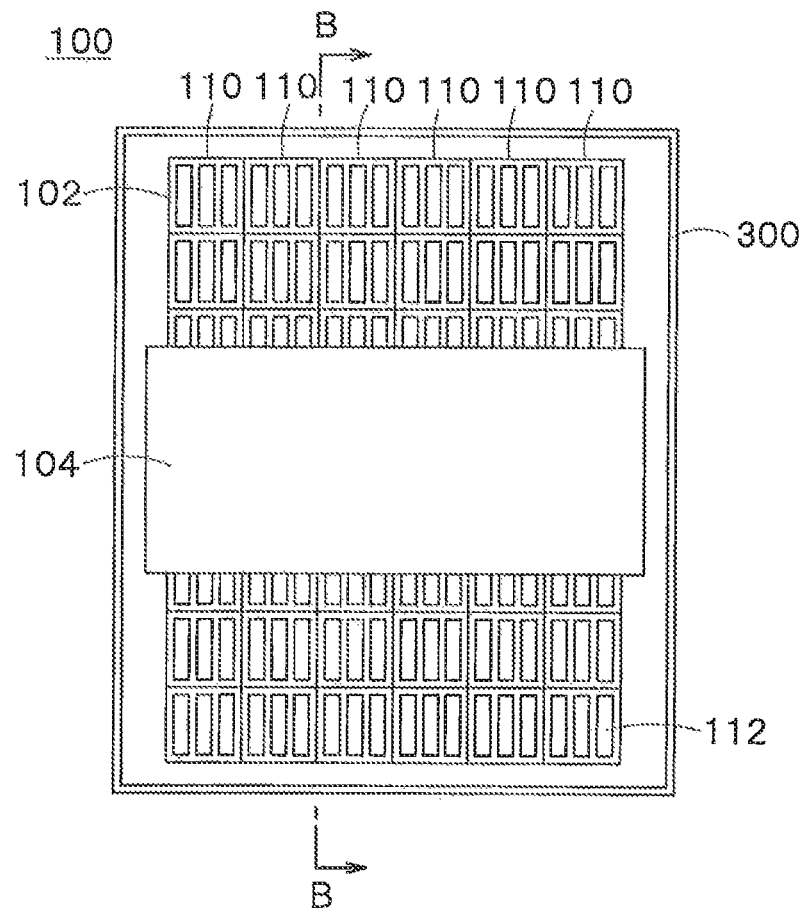
F I G. 29A
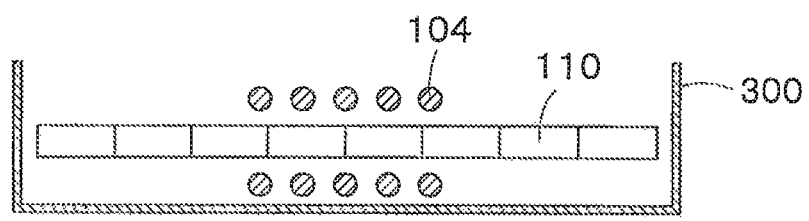
F I G. 29B

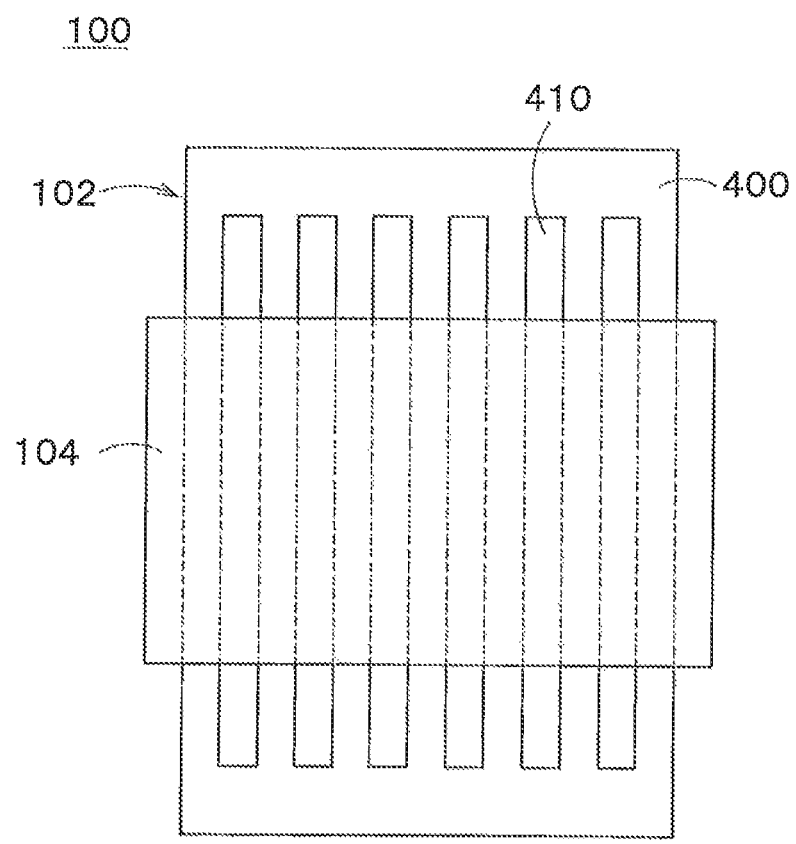
F I G. 30

COIL, POWER RECEIVING APPARATUS, AND POWER TRANSMITTING APPARATUS

CROSS REFERENCE TO RELATED APPLICATIONS

This application is based upon and claims the benefit of priority from the prior Japanese Patent Application No. 2013-44226, filed on Mar. 6, 2013, the entire contents of which are incorporated herein by reference.

FIELD

Embodiments described herein relate generally to a coil, a power receiving apparatus, and a power transmitting apparatus.

BACKGROUND

Recently, a wireless power transmission system configured to wirelessly transmit power by mutual inductance between a power transmitting inductor and a power receiving inductor in a non-contact manner has been adopted in many devices. In order to reduce the weight of a power transmitting coil that is used in the wireless power transmission system, a technique for forming a coil by rod-like ferrite cores arranged at regular intervals has been known.

However, in the case of using an elongated rod-like ferrite core, there has been a problem in that there is a need for a frame or the like for fixing individually the ferrite cores, and it is difficult to fix the ferrite cores.

BRIEF DESCRIPTION OF THE DRAWINGS

FIG. 1 is a block diagram of a wireless power transmission system according to a first embodiment;
FIG. 2 is a diagram illustrating an example of a capacitor;
FIGS. 14A to 14E are schematic diagrams of a magnetic core block according to a modified example;
FIG. 15 is a schematic diagram of a magnetic core block according to a modified example;
FIGS. 16A and 16B are schematic diagrams of a magnetic core block according to a modified example;
FIGS. 17A and 17B are schematic diagrams of a magnetic core block according to a modified example;
FIGS. 18A and 18B are schematic diagrams of a magnetic core block according to a modified example;
FIG. 19 is a schematic diagram of a coil according to a second embodiment;
FIG. 21 is a schematic diagram of a coil according to a modified example;
FIG. 22 is a schematic diagram of a coil according to a modified example;
FIGS. 23A and 23B are schematic diagrams of a magnetic core block according to a modified example;
FIGS. 24A and 24B are schematic diagrams of a magnetic core block according to a modified example;
FIGS. 25A and 25B are schematic diagrams of a magnetic core block according to a modified example;
FIGS. 28A and 28B are schematic diagrams of a coil according to a modified example;
FIGS. 29A and 29B are schematic diagrams of a coil according to a modified example;
and
FIG. 30 is a schematic diagram of a coil according to a modified example.

DETAILED DESCRIPTION

Figure 3A:
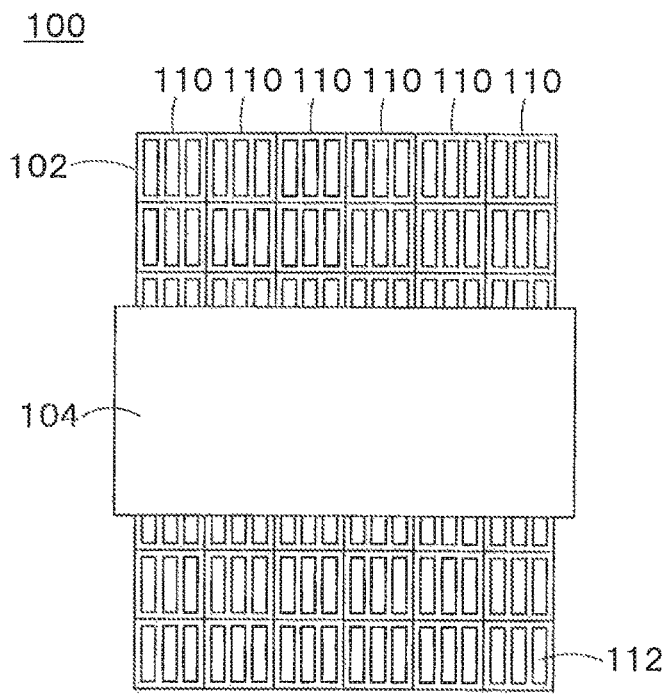
FIGS. 3A and 3B are schematic diagrams of a coil according to the first embodiment.

In one embodiment, a coil includes a magnetic core and a winding. The magnetic core includes at least one block provided with a groove or an opening. Each block is arranged so as to make the groove or the opening extend along a direction of magnetic flux.

Embodiments will now be explained with reference to the accompanying drawings.

First Embodiment

FIG. 1 illustrates a block configuration of a wireless power transmission system according to a first embodiment of the present invention. The wireless power transmission system includes a power transmitting apparatus 1, and a power receiving apparatus 2 to which electric power is wirelessly transmitted from the power transmitting apparatus 1, and the power receiving apparatus 2 supplies a load 28 of an electrical device with the transmitted electric power. The power receiving apparatus 2 may be provided inside the electrical device, may be provided integrally with the electrical device, and may be fixed to the exterior of an electrical device main body. For example, the electrical device is a portable terminal or an electric vehicle, and the load 28 is a rechargeable battery.

The power transmitting apparatus 1 includes a power supply unit 11 configured to perform the conversion from a commercial power source into RF for power transmission, a control unit 12 configured to control a required amount of power and control each unit of the power transmitting apparatus 1, a sensor 13, a communication unit 14, and a power transmitting coil 15. For example, the sensor 13 includes at least one of sensors used in the wireless power transmission between the power transmitting apparatus 1 and the power receiving apparatus 2, such as a temperature sensor configured to monitor heating of the power transmitting apparatus 1, a temperature sensor configured to monitor the heat of foreign objects entering between the power transmitting coil 15 and a power receiving coil 21 to be described below, a sensor configured to monitor the foreign objects by electromagnetic wave radar or ultrasonic radar, a sensor such as RFID for detecting the position of the power receiving coil 21, and an ammeter or a voltmeter for detecting the transmitted power. The communication unit 14 can communicate with a communication unit 27 of the power receiving apparatus 2 to be described below, and receives a power receiving status of the power receiving apparatus 2, or transmits a power transmitting status of the power transmitting apparatus 1.

The power receiving apparatus 2 includes a power receiving coil 21 that receives power by the mutual inductance with the power transmitting coil 15 of the power transmitting apparatus 1, a capacitor 22 connected to the power receiving coil 21, a rectifier 23 that converts AC power received via the capacitor 22 into DC power, a DC-DC converter 24 that changes a voltage conversion ratio based on the operating voltage of the load 28, a control unit 25 that controls each unit of the power receiving apparatus 2, a sensor 26, and a communication unit 27. When the received power is controlled on the power transmitting apparatus 1 side, it is possible not to provide the DC-DC converter 24.

The capacitor 22 may be connected in series with the power receiving coil 21, or may be connected in parallel therewith. Furthermore, as illustrated in FIG. 2, the capacitor 22 may be configured to include a capacitor element connected in parallel with the power receiving coil 21, and a capacitor element connected in series therewith.

For example, the sensor 26 includes at least one of sensors used in the wireless power transmission between the power transmitting apparatus 1 and the power receiving apparatus 2, such as a temperature sensor configured to monitor the heating of the power receiving apparatus 2, a temperature sensor configured to monitor the heat of the foreign objects entering between the power receiving coil 21 and the power transmitting coil 15, a sensor configured to monitor the foreign objects by electromagnetic wave radar or ultrasonic wave radar, a sensor such as RFID for detecting the position of the power transmitting coil 15, and an ammeter or a voltmeter for detecting the received power. The communication unit 27 can communicate with the communication unit 14 of the power transmitting apparatus 1, transmits the power receiving status of the power receiving apparatus 2, or receives the power transmitting status of the power transmitting apparatus 1.

The control unit 25 controls the received power (power supplied to the load 28) based on information acquired by the communication between the communication unit 27 and the power transmitting apparatus 1, and the detection result of the sensor 26.

Figure 3B:
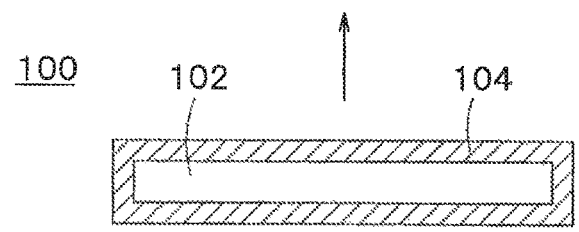

FIG. 3A is a top view of a coil 100 according to the first embodiment. Furthermore, FIG. 3B is a side view of the coil 100 when viewed from a direction of an arrow of FIG. 3A. The coil 100 is used as the power transmitting coil 15 and the power receiving coil 21 illustrated in FIG. 1.

As illustrated in FIGS. 3A and 3B, the coil 100 is a solenoid coil that includes a magnetic core 102 and a coil winding portion 104 wound around the magnetic core 102. As the coil winding portion 104, for example, a copper wire can be used. The magnetic core 102 includes a plurality of magnetic core blocks 110 (hereinafter, simply referred to as block 110) arranged on the same plane.

Figure 4A:
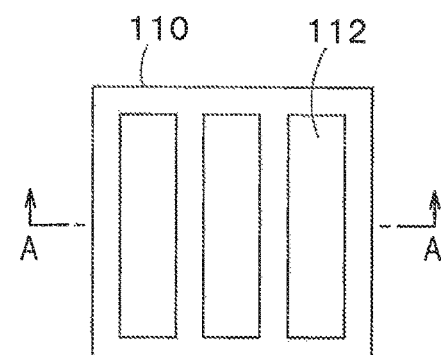
FIGS. 4A and 4B are schematic diagrams of a magnetic core block according to the first embodiment.
Figure 4B:
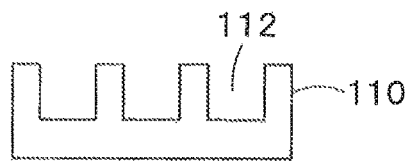

FIG. 4A is a top view of the block 110, and FIG. 4B is a longitudinal cross-sectional view taken along line A-A of FIG. 4A. As illustrated in FIGS. 4A and 4B, the block 110 is provided with a plurality of linear grooves (recesses) 112 parallel to each other. As the material of the block 110, for example, ferrite is used.

As illustrated in FIG. 3A, the block 110 is disposed so that the grooves 112 extend along a direction (a vertical direction in the FIG. 3A) of the magnetic flux generated by allowing the current to flow through the coil 100. In this way, an effect of arranging the block 110 will be described below.

Figure 5:
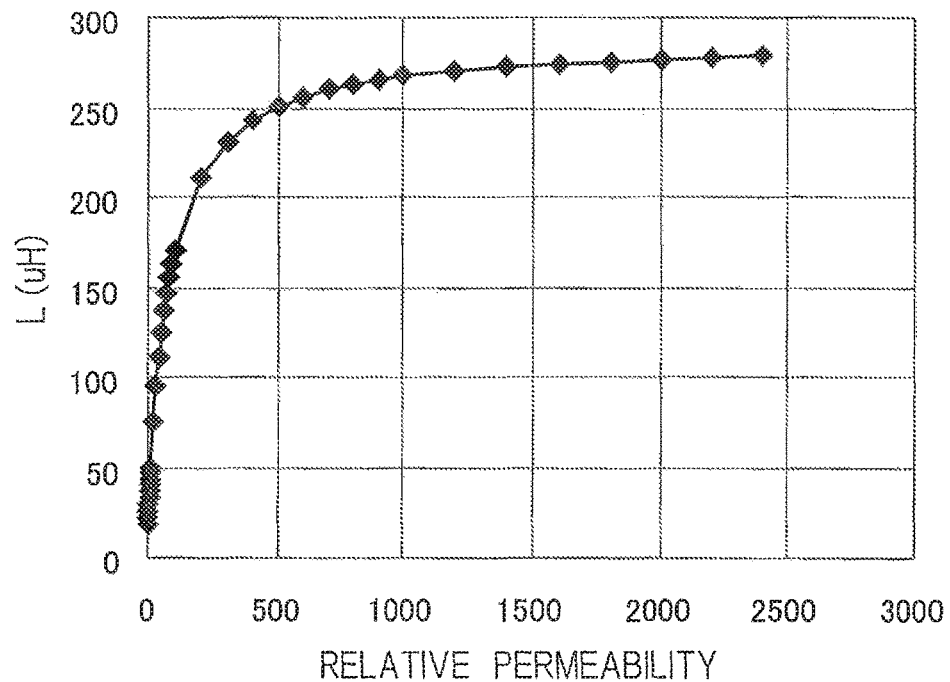
FIG. 5 is a graph illustrating a relation between a relative permeability and an inductance value.
Figure 6:
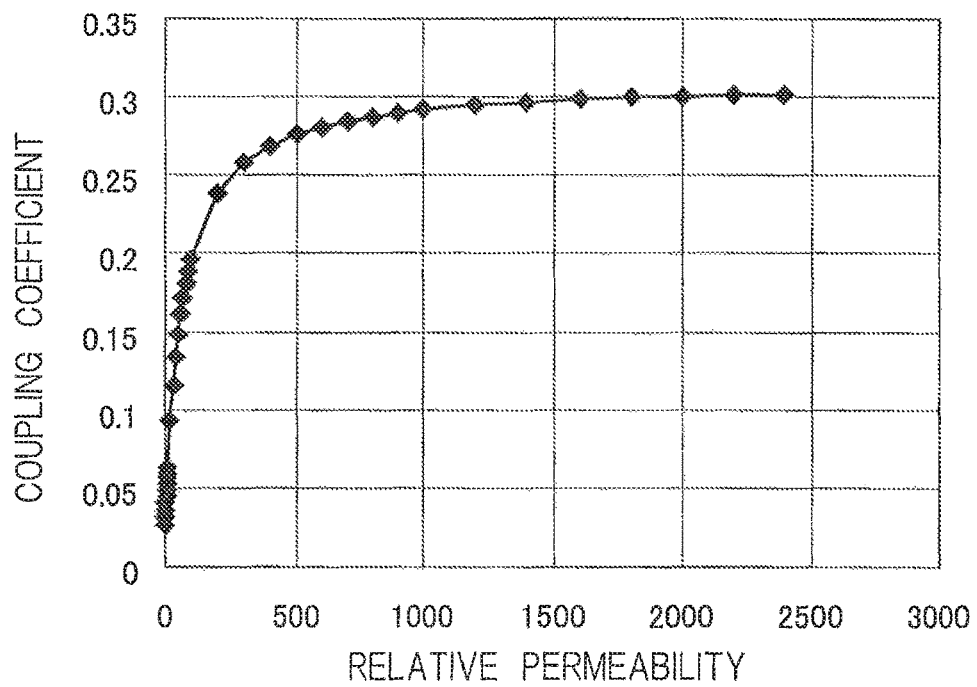
FIG. 6 is a graph illustrating a relation between the relative permeability and a coupling coefficient.

First, the description will be given of characteristics of the coil having the magnetic core (the magnetic core that is not provided with the groove) on which the planar ferrite block not provided with the groove is arranged. FIG. 5 illustrates a relation between a relative permeability of the magnetic core without a groove and an inductance value of the coil. Furthermore, FIG. 6 illustrates a relation between a relative permeability of the magnetic core without a groove and a coupling coefficient between the coils. As can be seen FIGS. 5 and 6, in the range of the relative permeability less than 1000, along with an increase in relative permeability, the inductance value and the coupling coefficient significantly increase. Meanwhile, in the range of the relative permeability of 1000 or more, along with an increase in relative permeability, the changes in the inductance value and the coupling coefficient are small. That is, in the range of relative permeability of 1000 or more, even when the relative permeability is reduced, the characteristics of the coil can be maintained.

Figure 7:
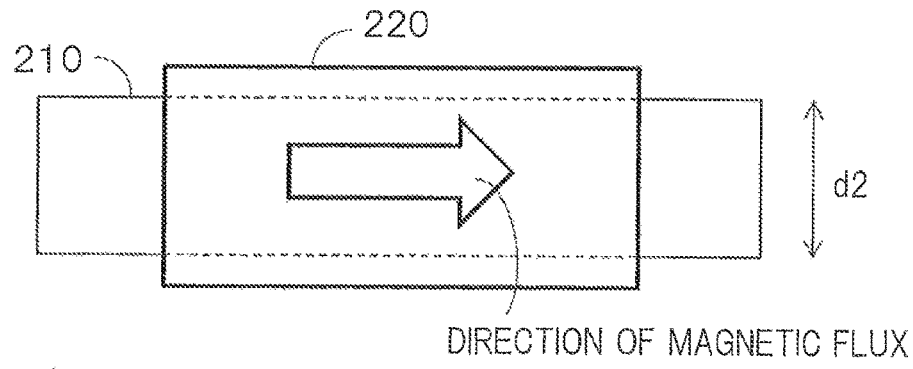
FIG. 7 is a side view illustrating an example of a coil.

Next, a relation between the configuration of the magnetic core and the inductance value of the coil will be described. FIG. 7 is a side view of the coil (solenoid) that includes a magnetic core 210 without a groove having a relative permeability μr, and a coil winding portion 220 wound around a magnetic core 210 without a groove. A direction of magnetic flux is a direction from left to right in FIG. 7, and the inductance value is set to L0. Furthermore, a length of the direction of magnetic flux of the magnetic core 210 without a groove is set to d1, and a length in a direction perpendicular to the direction of magnetic flux is set to d2.

Figure 8:
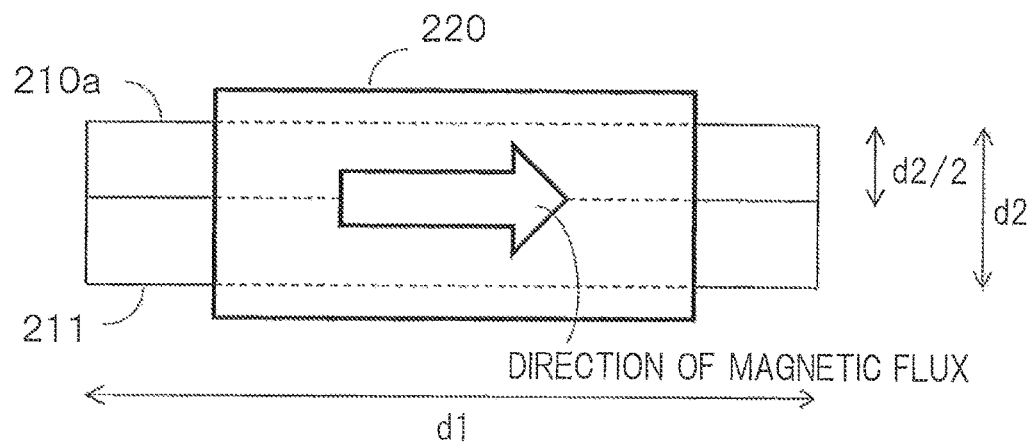
FIG. 8 is a side view illustrating an example of a coil.

As illustrated in FIG. 8, when a magnetic core 210a, in which a length in the direction perpendicular to the direction of magnetic flux of the magnetic core 210 is set to d2/2, and a core 211 having the relative permeability 1 with the same size as that of the magnetic core 210a are stacked (arranged) in the direction perpendicular to the direction of magnetic flux, a synthetic inductance value Lt of the coil is expressed in Equation 1 below. In addition, L1 is an inductance value due to the magnetic core 210a, and L2 is an inductance value due to the core 211. The core 211 having the relative permeability 1 is, for example, an air layer.

$$Lt = L1 + L2 = \mu_r \times \frac{L0}{2} + 1 \times \frac{L0}{2} = L0 \times \frac{(\mu_r + 1)}{2} \quad \text{(Equation 1)}$$

In this way, when the stacking direction of two substances (the magnetic core 210a and the core 211) is set to be perpendicular to the direction of magnetic flux, in other words, when the contact surface of the two substances is set to be parallel to the direction of magnetic flux, as equivalently illustrated in FIG. 7, the relative permeability in the case of replacing the same magnetic material with a jammed model becomes an arithmetic mean. The equivalent relative permeability $\mu_{re}$ at this time is expressed by Equation 2 below. The volume density of each medium is indicated by $\rho_i$.

$$\mu_{re} = \sum_{i=1}^{N} \rho_i \mu_r \quad \text{(Equation 2)}$$

Figure 9:
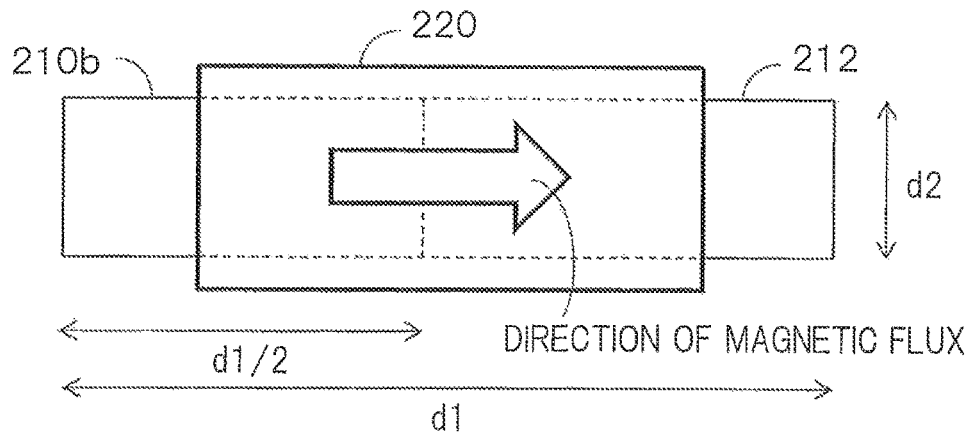
FIG. 9 is a side view illustrating an example of a coil.

As illustrated in FIG. 9, when the magnetic core 210b in which the length, in the direction of magnetic flux of the magnetic core 210 is set to d½, and the core 212 of the relative permeability 1 with the same size as that of the magnetic core 210b are stacked (arranged) in the direction of magnetic flux, the synthetic inductance value Lt of the coil is as expressed in Equation 3 below.

$$Lt = \frac{1}{L1} + \frac{1}{L2} = \frac{2}{\mu_r \times L0} + \frac{2}{1 \times L0} = \frac{2(\mu_r + 1)}{\mu_r \times L0}$$ (Equation 3)

In this manner, when the stacking direction of the two substances (the magnetic core 210b and the core 212) is set to be the direction of magnetic flux, in other words, when the contact surface of the two substances is perpendicular to the direction of magnetic flux, the equivalent relative permeability becomes a harmonic mean. The equivalent relative permeability $\mu_{re}$ at this time is expressed by Equation 4 below.

$$\mu_{re} = \left(\sum_{i=1}^{N} \frac{\rho_i}{\mu_i}\right)^{-1}$$ (Equation 4)

Figure 10:
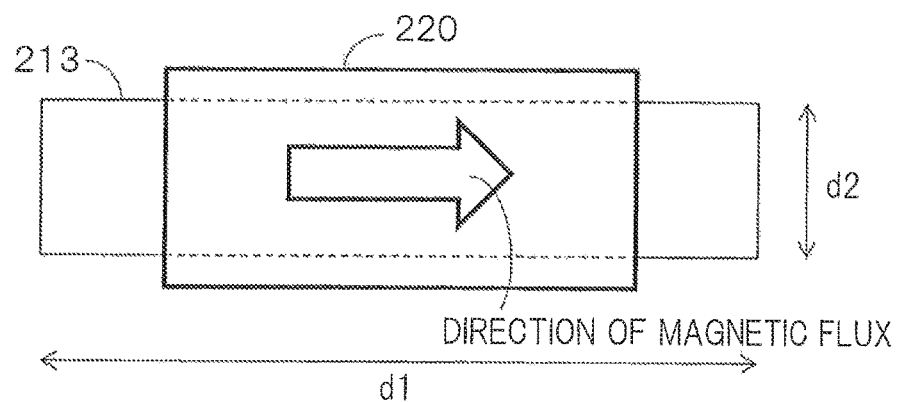
FIG. 10 is a side view illustrating an example of a coil.

As illustrated in FIG. 10, when using a magnetic core 213 in which the same substance as the magnetic core 210 is mixed uniformly with a substance of relative permeability 1 in the same size as the magnetic core 210, the synthetic inductance value Lt of the coil is expressed in Equation 5 below.

$$Lt = \sqrt{\mu_r} L0$$ (Equation 5)

Thus, when two substances are uniformly mixed, the equivalent relative permeability becomes a geometric mean. The equivalent relative permeability $\mu_{re}$ at this time is expressed by Equation 6 below.

$$\mu_{re} = \sqrt{\frac{\sum_{i=1}^{N}(\rho_i \mu_i)}{\sum_{i=1}^{N}\left(\frac{\rho_i}{\mu_i}\right)}}$$ (Equation 6)

Figure 11:
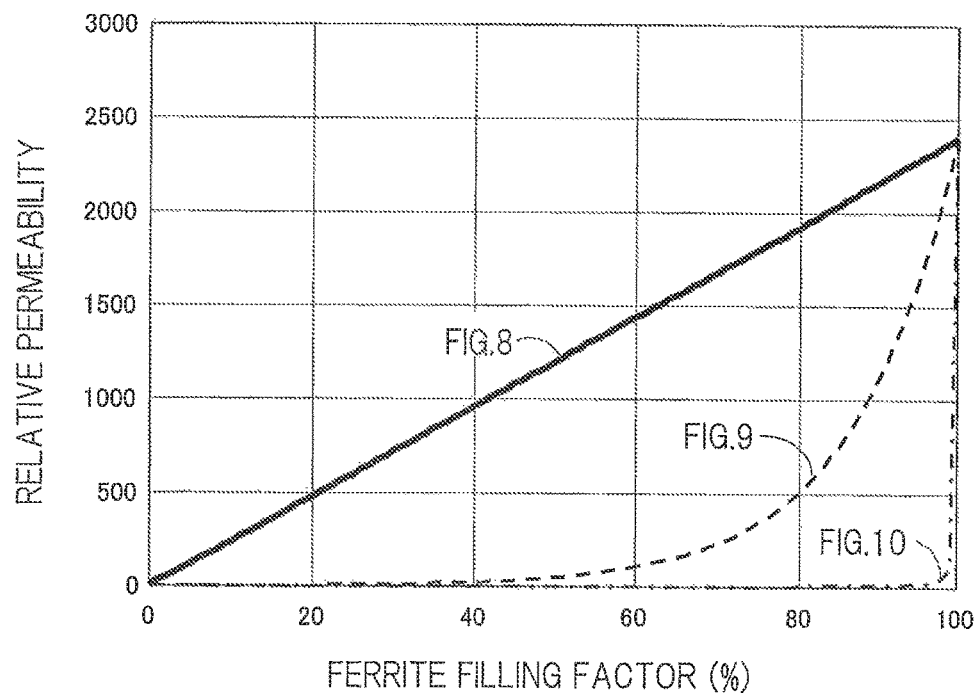
FIG. 11 is a graph illustrating a relation between a ferrite filling factor and the relative permeability.
Figure 12:
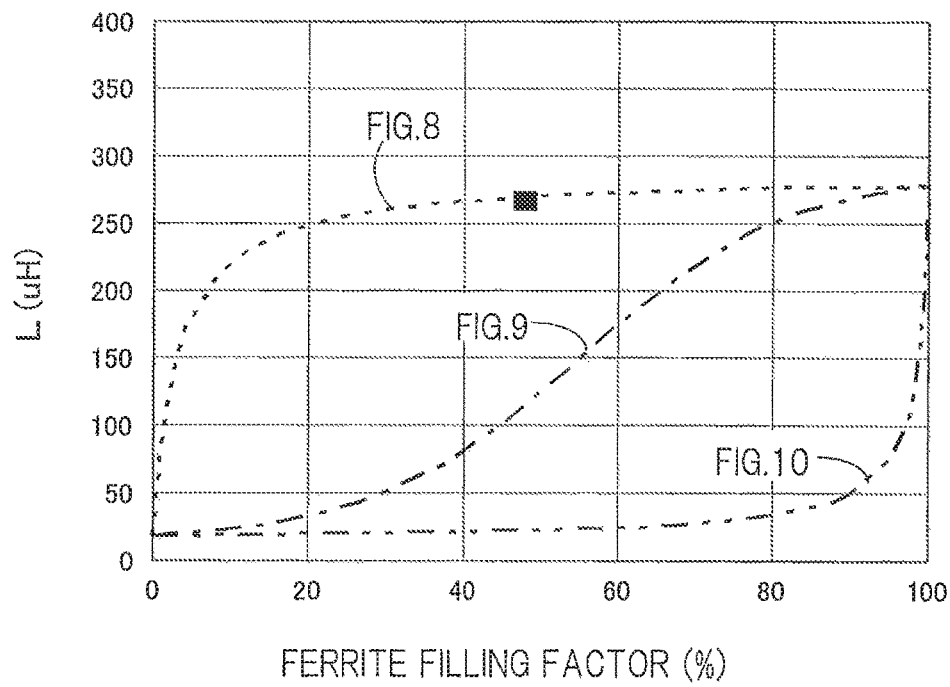
FIG. 12 is a graph illustrating a relation between the ferrite filling factor and the inductance value.
Figure 13:
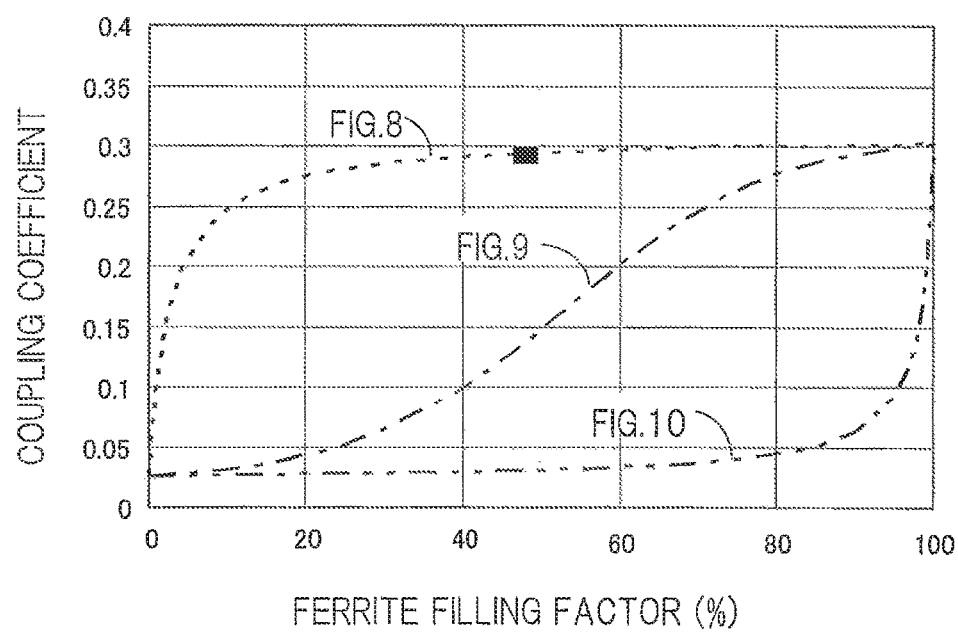
FIG. 13 is a graph illustrating a relation between the ferrite filling factor and the coupling coefficient.

In regard to the coil having the configuration illustrated in FIGS. 8 to 10, a relation between the filling factor (percentage) of the material (for example, ferrite) of the relative permeability μr of the entire core and the equivalent relative permeability is illustrated in FIG. 11. Furthermore, FIG. 12 illustrates a relation between the ferrite filling factor and the inductance value. Furthermore, FIG. 13 illustrates a relation between the ferrite filling factor and the coupling coefficient.

In the configuration illustrated in FIG. 9, it can be seen from FIG. 11 that along with a decrease in the ferrite filling factor, the equivalent relative permeability decreases exponentially. For that reason, as illustrated in FIGS. 12 and 13, along with the decrease in the ferrite filling factor, the inductance value and the coupling coefficient decrease.

Furthermore, in the configuration illustrated in FIG. 10, the ferrite filling factor only slightly decreases from 100%, and the equivalent relative permeability suddenly decreases to nearly zero. For that reason, as illustrated in FIGS. 12 and 13, the ferrite filling factor only decreases slightly from 100%, and therefore, the inductance value and the coupling coefficient greatly decrease.

Meanwhile, in the configuration illustrated in FIG. 8, along with a decrease in the ferrite filling factor, the equivalent relative permeability proportionally and linearly decreases. The configuration illustrated in FIG. 8 is able to suppress a decrease in the equivalent relative permeability due to the decrease in the ferrite filling factor, compared to the configurations illustrated in FIGS. 9 and 10. For example, in the case of the configuration illustrated in FIG. 8, even when the ferrite filling factor is set to 50%, the relative permeability is 1000 or more. As described above, in the range of the relative permeability of 1000 or more, even when the relative permeability decreases, it is possible to maintain the characteristics of the coil (see FIGS. 5 and 6). For that reason, as illustrated in FIGS. 12 and 13, even when the ferrite filling factor is reduced to 50%, it is possible to suppress the decrease in the inductance value and the coupling coefficient.

Accordingly, as illustrated in FIG. 3A, it is possible to reduce the volume and the weight of the magnetic core 102 by using the block 110 provided with the grooves 112. Furthermore, by arranging the block 110 such that the grooves 112 extend along (to be parallel to) the direction of magnetic flux, it is possible to prevent the degradation of the characteristics of the coil. In FIGS. 12 and 13, the inductance value and the coupling coefficient obtained when the volume of the magnetic core provided with the grooves 112 is set to about 50% (of the core without the groove) are plotted with a black rectangular marker.

In addition, when using the elongated rod-like ferrite, a frame or the like for fixing each ferrite is required, but when using the block 110, it is possible to easily fix the block 110 by simply spreading.

In this way, according to the embodiment, it is possible to reduce the weight of the coil, to facilitate the fixing of the ferrite, and to prevent the degradation of the characteristics.

For example, the block 110 provided with the grooves 112 as described above can be produced by putting the magnetic material into a mold having a concave-convex structure and firing the magnetic material.

In the first embodiment, as illustrated in FIG. 4, the block 110 forms a square, and the groove 112 is designed so as to be parallel to the side of the square. However, as illustrated in FIG. 14A, the groove 112 may be provided oblique to the side of the square (along a diagonal direction of the square) depending on the direction of the magnetic flux. Furthermore, as illustrated in FIG. 14B, the groove 112 may be thicker. Furthermore, as illustrated in FIG. 14C, the shape of the groove 112 may not be rectangular. In addition, as illustrated in FIGS. 14D and 14E, a configuration obtained by coupling the plurality of grooves 112 of FIG. 14A may be provided.

The shape of the block 110 is not limited to the square, and, for example, as illustrated in FIG. 15, the shape may be rectangular. In addition, the block 110 may be rhombus. In addition, as illustrated in FIGS. 16A and 16B, the block 110 may form a triangle such as an equilateral triangle. Furthermore, as illustrated in FIGS. 17A and 17B, the block 110 may also form a hexagon such as a regular hexagon. In addition, as illustrated in FIGS. 18A and 18B, the block 110 may also form an octagon such as a regular octagon.

The depth, the width, and the number of the grooves 112 provided in the block 110 may be arbitrarily determined depending on the required weight and characteristics of the coil.

Furthermore, the groove 112 provided in the block 110 may be an opening.

All the blocks constituting the magnetic core 102 may be the blocks 110 provided with the grooves 112, or a portion of the magnetic core 102 may be constituted by the block that is not provided with the groove 112.

Furthermore, compared to the block 110 provided with the grooves 112, since the block not provided with the groove 112 has a small core loss, the heating thereof is small. Thus, it is preferred to reduce the heating, by arranging the block not provided with the groove 112 in the periphery of the part required to avoid the influence due to heat.

Second Embodiment

FIG. 19 illustrates a schematic configuration of a coil according to a second embodiment. This coil is used in the power transmitting coil 15 and the power receiving coil 21 illustrated in FIG. 1.

As illustrated in FIG. 19, the coil is a spiral coil that includes a magnetic core 122, and a coil winding portion 124 provided on one surface of the magnetic core 122. The magnetic core 122 includes a plurality of magnetic core blocks 130A and 130B (hereinafter, simply referred to as blocks 130A and 130B) which are arranged on the same plane. For convenience of description, in regard to the coil winding portion 124, an inner peripheral portion and an outer peripheral portion thereof are only illustrated by broken lines.

Similarly to the block 110 in the first embodiment, the block 130A and 130B are provided with linear grooves (recesses) 132. As the material of the blocks 130A and 130B, for example, ferrite is used.

Unlike the coil 100 of the first embodiment, in the coil according to the present embodiment, the direction of magnetic flux is not limited to one direction. For that reason, in the present embodiment, as illustrated in FIG. 19, by using two types of blocks of a square block 130A vertically provided with the grooves 132, and a square block 130B obliquely provided with the grooves 132, the blocks 130A and 130B are arranged so that the grooves 132 extend along the direction of magnetic flux.

By using the blocks 130A and 130B provided with the grooves 132, it is possible to reduce the volume and the weight of the magnetic core 122. Furthermore, by arranging the blocks 130A and 130B so that the grooves 132 extend along the direction of magnetic flux, it is possible to prevent the degradation of the characteristics of the coil. Furthermore, by using the blocks 130A and 130B, it is possible to increase the strength of the magnetic core compared to the case that the elongated rod-like ferrite is used.

In this way, according to the embodiment, it is possible to prevent the degradation of the strength and characteristics, while reducing the weight of the coil.

Figure 20:
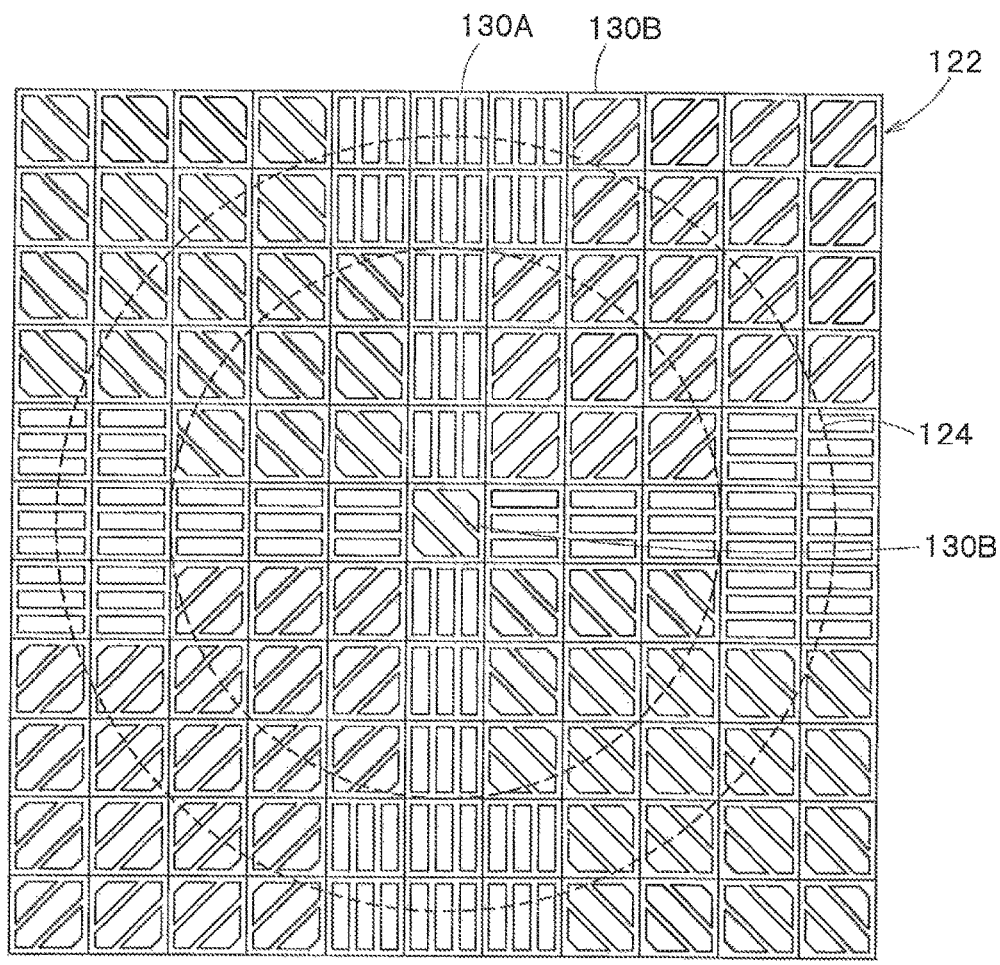
FIG. 20 is a schematic diagram of a coil according to a modified example.
Figure 26A:
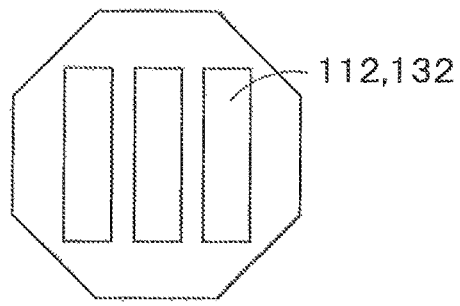
FIGS. 26A and 26B are schematic diagrams of a magnetic core block according to a modified example.
Figure 26B:
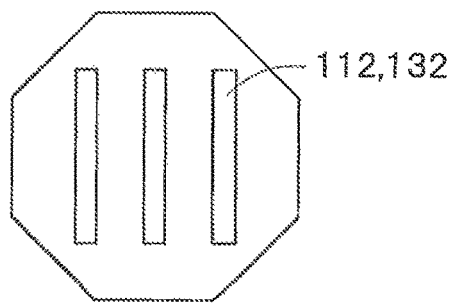
Figure 27A:
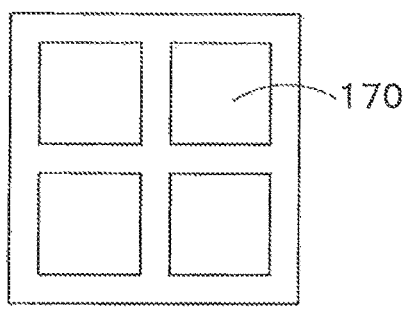
FIGS. 27A to 27D are schematic diagrams of a magnetic core block according to a modified example.
Figure 27B:
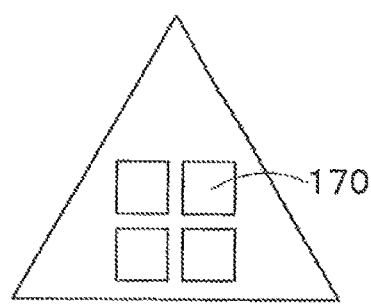
Figure 27C:
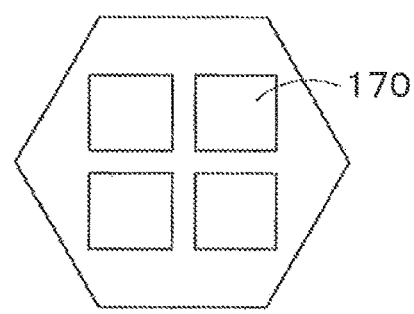
Figure 27D:
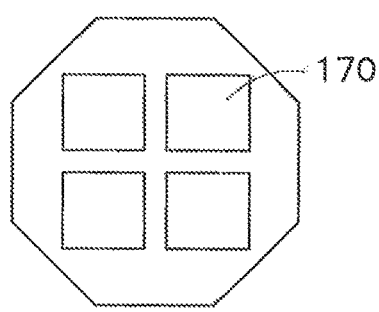

In FIG. 19, the block located at the center of the coil winding portion 124 is used as the block 130A vertically provided with the grooves 132, but the block 130B obliquely provided with the grooves 132 may be used, as illustrated in FIG. 20. Furthermore, as illustrated in FIG. 21, a block 140 provided with non-directional grooves (for example, square recesses) may be used.

In the second embodiment, as illustrated in FIG. 22, a block 150 without a groove may be arranged in the area of a part of the magnetic core. Accordingly, it is possible to arbitrarily adjust the gravity position of the coil.

In the first and second embodiments, the blocks having the different filling factors (sizes and depths of the grooves 112 and 132 are different) may be arranged at a position where the magnetic flux is concentrated and a position where the magnetic flux is not concentrated. FIGS. 23 to 26 illustrate an example of the block having the different filling factors. For example, it is preferable that the block having the high filling factor, in other words, the block having the small size and depth of the groove be arranged at the position where the magnetic flux is concentrated. Furthermore, it is preferable that the block having the low filling factor, in other words, the block having the large size and depth of the groove be arranged at the position where the magnetic flux is not concentrated.

Furthermore, in the first and second embodiments, the magnetic cores 102 and 122 may include the blocks provided with a non-dimensional groove (for example, a square recess) 170 as illustrated in FIGS. 27A to 27D.

As illustrated in FIGS. 28A and 28B, a part of the magnetic core 122 is not provided, two coils are prepared in which the existence regions of the magnetic cores do not overlap when arranged to face each other, one thereof may be applied to the power transmitting coil 15, and the other thereof may be applied to the power receiving coil 21. Accordingly, when the power transmitting coil 15 and the power receiving coil 21 are misaligned, it is possible to suppress the fluctuation of the coupling coefficient.

In the first and second embodiments, as illustrated in FIGS. 29A and 29B, the coil 100 may include a conductive plate 300. FIG. 29A is a top view of the coil 100. Furthermore, FIG. 29B is a longitudinal cross-sectional view taken along line B-B of FIG. 29A. For example, the conductive plate 300 is a metal plate such as an aluminum plate and a copper plate.

In the above embodiment, although the magnetic cores 102 and 122 are equipped with the plurality of magnetic core blocks 110, 130A, and 130B, the magnetic cores 102 and 122 may be constituted by a single magnetic core block provided with a plurality of linear grooves (recesses) parallel to each other. By constituting the magnetic cores 102 and 122 by a single magnetic core block, it is possible to further facilitate the fixation of the core. FIG. 30 illustrates an example in which the magnetic core 102 according to the first embodiment is constituted by a single magnetic core block 400. Grooves 410 provided in the magnetic core block 400 extend along a direction (the vertical direction in FIG. 30) of the magnetic flux generated by allowing the current to flow through the coil 100.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:
1. A coil comprising:
a magnetic core; and
a winding,
wherein
the magnetic core includes a plurality of blocks comprising a magnetic body and an elongate groove or opening, the elongate groove or opening is provided in the magnetic body, the plurality of blocks are arranged so the elongated groove or the opening of the plurality of blocks extend along a direction of magnetic flux, and the plurality of blocks are arranged so the magnetic body of each of the plurality of blocks is in contact with the magnetic body of adjacent blocks in the magnetic core.

2. The coil according to claim 1, wherein each block is provided with a plurality of grooves or openings.

3. The coil according to claim 1, wherein the shape of the plurality of blocks is a regular triangle, a square, a regular hexagon, or a regular octagon.

4. The coil according to claim 1, further comprising a conductive plate.

5. The coil according to claim 1, wherein
the winding is wound around the magnetic core,
a shape of each of the plurality of blocks is a rectangle, and
the groove or opening of the plurality of blocks is provided in parallel to one side of the rectangle.

6. The coil of claim 1, wherein the magnetic body of the plurality of blocks comprises ferrite.

7. A coil comprising a magnetic core and a winding, wherein
the magnetic core includes at least one block provided with a groove or an opening,
each block is arranged so as to make the groove or the opening extend along a direction of magnetic flux,
the winding is arranged on one surface of the magnetic core,
the magnetic core includes a first one of the at least one block and a second one of the at least one block forming a rectangular shape,
the groove or the opening of the first block is provided in parallel to one side of the rectangle, and
the groove or the opening of the second block is provided obliquely to one side of the rectangle.

8. The coil according to claim 7, wherein the magnetic core further includes a third block that is not provided with the groove and the opening.

9. The coil according to claim 7, wherein the magnetic core further includes a third block that is provided with the groove or the opening of the rectangle.

10. The coil according to claim 7, wherein the magnetic core has the first block and the second block in which the sizes of the groove or the opening are different.

11. A power receiving apparatus comprising:
a power receiving coil receiving power wirelessly by mutual inductance from a power transmitting apparatus;
a capacitor connected to the power receiving coil;
a rectifier converting AC power received via the capacitor into DC power;
a communication unit communicating a power transmitting status or a power receiving status with the power transmitting apparatus;
a sensor performing at least one of detection of received power, detection of foreign object, and detection of temperature; and
a control unit controlling the received power, based on received information of the communication unit or a detection result of the sensor,
wherein
the power receiving coil includes a magnetic core and a winding, the magnetic core includes a plurality of blocks comprising a magnetic body and an elongate groove or opening, the elongate groove or opening is provided in the magnetic body, the plurality of blocks are arranged so the groove or opening of the plurality of blocks extend along a direction of magnetic flux, and the plurality of blocks are arranged so the magnetic body of each of the plurality of blocks is in contact with the magnetic body of adjacent blocks in the magnetic core.

12. The apparatus according to claim 11, wherein each block is provided with a plurality of grooves or openings.

13. The apparatus according to claim 11, wherein
the winding is wound around the magnetic core,
a shape of each of the plurality of blocks is a rectangle, and
the groove or opening of the plurality of blocks is provided in parallel to one side of the rectangle.

14. A power receiving apparatus comprising:
a power receiving coil receiving power wirelessly by mutual inductance from a power transmitting apparatus;
a capacitor connected to the power receiving coil;
a rectifier converting AC power received via the capacitor into DC power;
a communication unit communicating a power transmitting status or a power receiving status with the power transmitting apparatus;
a sensor performing at least one of detection of received power, detection of foreign object, and detection of temperature; and
a control unit controlling the received power, based on received information of the communication unit or a detection result of the sensor,
wherein
the power receiving coil includes a magnetic core and a winding,
the magnetic core includes at least one block provided with a groove or an opening,
a plurality of the blocks are arranged so as to make the groove or the opening extend along a direction of magnetic flux,
the winding is arranged on one surface of the magnetic core,
the magnetic core includes a first one of the blocks and a second one of the blocks forming a rectangular shape,
the groove or the opening of the first block is provided in parallel to one side of the rectangle, and
the groove or the opening of the second block is provided obliquely to one side of the rectangle.

15. The apparatus according to claim 14, wherein the magnetic core further includes a third block that is not provided with the groove and the opening.

16. The apparatus according to claim 14, wherein the magnetic core further includes a third block that is provided with the groove or the opening of the rectangle.

17. A power transmitting apparatus comprising:
a power supply unit supplying a high-frequency power;
a power transmitting coil wirelessly transmitting the power from the power supply unit to a power receiving apparatus by mutual inductance;
a communication unit communicating a power transmitting status or a power receiving status with the power receiving apparatus;

a sensor performing at least one of detection of transmission power, detection of foreign object, and detection of temperature; and a control unit controlling the transmission power based on received information of the communication unit or a detection result of the sensor, wherein the power transmitting coil includes a magnetic core and a winding, the magnetic core includes a plurality of blocks comprising a magnetic body and an elongate groove or opening, the elongate groove or opening is provided in the magnetic body, the plurality of blocks are arranged so the groove or opening of the plurality of blocks extend along a direction of magnetic flux, and the plurality of blocks are arranged so the magnetic body of each of the plurality of blocks is in contact with the magnetic body of adjacent blocks in the magnetic core.

18. The apparatus according to claim 17, wherein
the winding is wound around the magnetic core,
a shape of each of the plurality of blocks is a rectangle, and
the groove or opening of the plurality of blocks is provided in parallel to one side of the rectangle.

19. A power transmitting apparatus comprising:
a power supply unit supplying a high-frequency power;
a power transmitting coil wirelessly transmitting the power from the power supply unit to a power receiving apparatus by mutual inductance;
a communication unit communicating a power transmitting status or a power receiving status with the power receiving apparatus;
a sensor performing at least one of detection of transmission power, detection of foreign object, and detection of temperature; and
a control unit controlling the transmission power based on received information of the communication unit or a detection result of the sensor, wherein the power transmitting coil includes a magnetic core and a winding, the magnetic core includes at least one block provided with a groove or an opening, each block is arranged so as to make the groove or the opening extend along a direction of magnetic flux, the winding is arranged on one surface of the magnetic core, the magnetic core includes a first one of the at least one block and a second one of the at least one block forming a rectangular shape, the groove or the opening of the first block is provided in parallel to one side of the rectangle, and the groove or the opening of the second block is provided obliquely to one side of the rectangle.

20. The apparatus according to claim 19, wherein the magnetic core further includes a third block that is not provided with the groove and the opening.

21. The apparatus according to claim 19, wherein the magnetic core further includes a third block that is provided with the groove or the opening of the rectangle.

* * * * *